US009690911B2

(12) United States Patent
Suzuki et al.

(10) Patent No.: US 9,690,911 B2
(45) Date of Patent: Jun. 27, 2017

(54) INFORMATION DISTRIBUTION APPARATUS, INFORMATION DISTRIBUTION SYSTEM, INFORMATION DISTRIBUTION METHOD, AND RECORDING MEDIUM

(71) Applicant: YAHOO JAPAN CORPORATION, Tokyo (JP)

(72) Inventors: Yoshio Suzuki, Tokyo (JP); Tatsuya Kawase, Tokyo (JP); Taku Kusano, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 757 days.

(21) Appl. No.: 14/080,435

(22) Filed: Nov. 14, 2013

(65) Prior Publication Data

US 2014/0143153 A1   May 22, 2014

(30) Foreign Application Priority Data

Nov. 22, 2012  (JP) ................................. 2012-256914

(51) Int. Cl.
  *G06F 21/00* (2013.01)
  *G06F 21/10* (2013.01)
  *G06F 21/35* (2013.01)

(52) U.S. Cl.
  CPC .............. *G06F 21/10* (2013.01); *G06F 21/35* (2013.01)

(58) Field of Classification Search
  CPC .. G06F 21/35; G06F 21/10; G06F 2221/2111; G06Q 20/02; G06Q 20/06;
  (Continued)

(56) References Cited

U.S. PATENT DOCUMENTS

2003/0088521 A1* 5/2003 Kodaka ................. G06Q 20/02
                                                           705/76
2007/0214061 A1* 9/2007 Toyokawa ......... G06Q 30/0601
                                                          705/26.1
(Continued)

FOREIGN PATENT DOCUMENTS

JP  A-2001-273705  10/2001
JP  A-2002-203119   7/2002
(Continued)

OTHER PUBLICATIONS

Jun. 14, 2016 Office Action issued in Japanese Patent Application No. 2014-185414.

(Continued)

*Primary Examiner* — Don Zhao
(74) *Attorney, Agent, or Firm* — Oliff PLC

(57) ABSTRACT

An information distribution apparatus includes an acquiring unit that acquires individual identification information, product identification information, and user identification information. The information distribution apparatus includes a storing unit that stores the authentication information and the user identification information in an associated manner in a predetermined storing device. The information distribution apparatus includes a deciding unit that decides, whether the received authentication information and the received user identification information are stored in an associated manner in the predetermined storing device. The information distribution apparatus includes a distributing unit that distributes, when it is decided by the deciding unit that the received authentication information and the received user identification information are stored in an associated manner in the predetermined storing device, content that is identified by product identification information that is asso- (Continued)

ciated with the authentication information to the terminal device.

8 Claims, 12 Drawing Sheets

(58) Field of Classification Search
CPC .... G06Q 20/20; G06Q 20/3821; G06Q 30/02; H04L 63/126; H04L 63/0876; H04W 12/06
See application file for complete search history.

(56) References Cited

U.S. PATENT DOCUMENTS

| | | | | |
|---|---|---|---|---|
| 2008/0155614 A1* | 6/2008 | Cooper | ................ | G06F 21/10 725/91 |
| 2009/0138367 A1* | 5/2009 | Okawa | ................ | G06Q 20/02 705/26.1 |
| 2010/0063870 A1* | 3/2010 | Anderson | ............. | G06Q 10/10 705/7.29 |
| 2010/0121701 A1* | 5/2010 | Nguyen | ................ | G06Q 20/20 705/14.38 |
| 2013/0262309 A1* | 10/2013 | Gadotti | ............. | G06Q 20/3276 705/44 |
| 2013/0297516 A1* | 11/2013 | Mampaey | ............. | G06Q 20/02 705/71 |
| 2014/0027506 A1* | 1/2014 | Heo | ................... | G06K 19/0725 235/380 |

FOREIGN PATENT DOCUMENTS

| | | |
|---|---|---|
| JP | A-2002-279102 | 9/2002 |
| JP | A-2003-187118 | 7/2003 |
| JP | A-2004-4245 | 1/2004 |
| JP | A-2005-056240 | 3/2005 |
| JP | 2011-191995 A | 9/2011 |
| JP | 5620968 B2 | 11/2014 |

OTHER PUBLICATIONS

Office Action issued in Japanese Application No. 2012-256914 mailed Jun. 10, 2014 (with translation).

* cited by examiner

| JAN CODE | LOT NUMBER |
|---|---|
| JAN#1 | 000001 TO 999999 |
| JAN#2 | 000001 TO 499999 |
| JAN#3 | 500000 TO 999999 |
| ⋮ | ⋮ |

FIG.5

| JAN CODE | AUTHENTICATED LOT NUMBER |
|---|---|
| JAN#1 | 500000 |
| JAN#2 | 500001 |
| JAN#3 | 596103 |
| ⋮ | ⋮ |

FIG.6

| USER ID | CONTENT ID | JAN CODE |
|---|---|---|
| U0001 | CID#1 | JAN#1 |
| U0002 | CID#3 | JAN#3 |
| U0003 | CID#4 | JAN#4 |
| ⋮ | ⋮ | ⋮ |

FIG.7

| CONTENT ID | AUTHENTICATION INFORMATION |
|---|---|
| CID#1 | CI#1 |
| CID#2 | CI#2 |
| CID#3 | CI#3 |
| CID#4 | CI#4 |
| ⋮ | ⋮ |

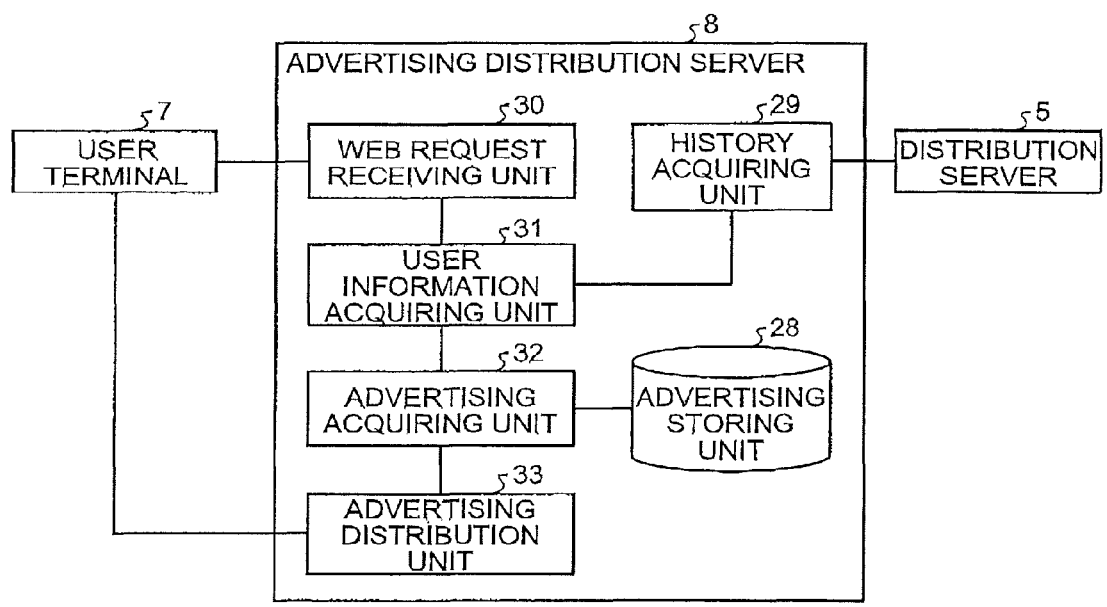

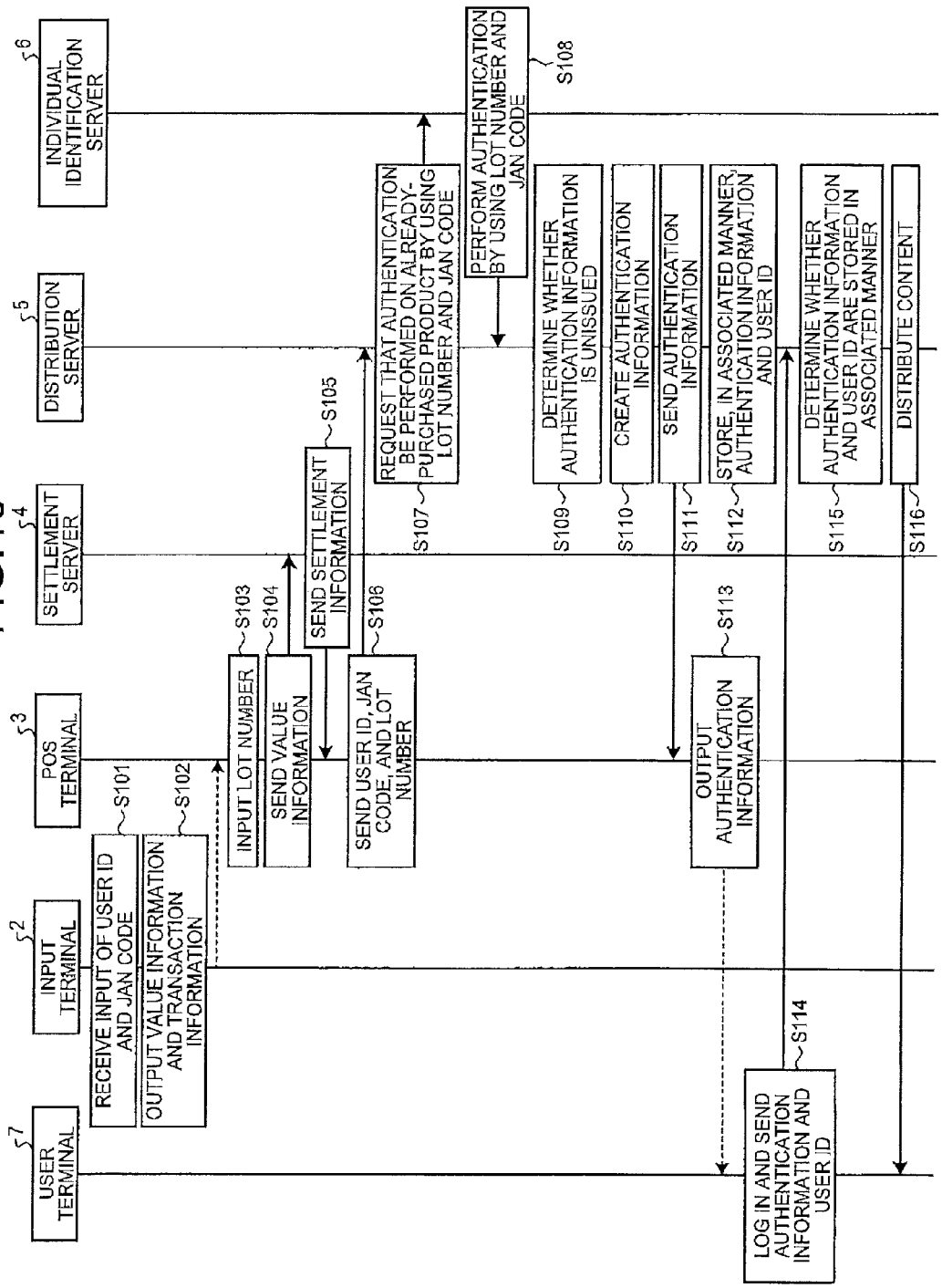

INFORMATION DISTRIBUTION APPARATUS, INFORMATION DISTRIBUTION SYSTEM, INFORMATION DISTRIBUTION METHOD, AND RECORDING MEDIUM

CROSS-REFERENCE TO RELATED APPLICATIONS

The present application claims priority to and incorporates by reference the entire contents of Japanese Patent Application No. 2012-256914 filed in Japan on Nov. 22, 2012.

BACKGROUND OF THE INVENTION

1. Field of the Invention

The present invention relates to an information distribution apparatus, an information distribution system, an information distribution method, and a recording medium.

2. Description of the Related Art

Conventionally, content of various kinds is recorded in books and on magnetic recording media, such as video tapes, and physical media, such as compact discs (CDs), digital video discs (DVDs), and blue-ray Discs (BDs). Furthermore, in recent years, digital content, such as music, moving images, and electronic books, that is not recorded in media has been provided on the Internet, and users are viewing and listening to this digital content on terminal devices, such as smart phones, personal digital assistants (PDAs), and personal computers (PCs).

Furthermore, systems using conventional techniques are available that allow purchased content to be enjoyed regardless of whether it is on packaged media or digitally distributed (Patent Document 1: Japanese Laid-open Patent Publication No. 2005-056240). Specifically, a content owner gives a content use right for content that a user requests to acquire and the user pays compensation for this use right. When the user sends a delivery request for the content for which the use right has been given to the user, the content owner delivers the content to the user by converting uncompressed content to the data form that was specified when the request was sent. Alternatively, when a user makes a request to acquire content off-line, the content owner converts the content, for which the use right has been given to the user, to the data form that is specified when the request was sent, records the content on a specified recording medium, and then delivers the content to the user.

However, with the conventional techniques, unless the user purchases the use right for an item of given content, the user is not able to enjoy the content both on a physical medium and via data distribution. Specifically, with the conventional techniques, even if a user purchased a medium in which the content is normally recorded, the user again needs to purchase the use right for the content in order to receive the same content digitally. Consequently, even when a user likes some content that is recorded in a purchased medium, it is difficult for the user to easily enjoy the same content via digital distribution. Furthermore, there may be a system in which digital content is unconditionally delivered to the user who purchased the medium; however, it is not possible to secure the use right protection of the content.

SUMMARY OF THE INVENTION

It is an object of the present invention to at least partially solve the problems in the conventional technology.

According to one aspect of an embodiment of the present invention, an information distribution apparatus includes an acquiring unit that acquires individual identification information that is used for individual identification of a medium in which content is normally recorded, product identification information that is used for product identification of the medium, and user identification information that identifies a user. The information distribution apparatus includes a determining unit that determines whether the individual identification information acquired by the acquiring unit was acquired in the past. The information distribution apparatus includes a creating unit that creates, when the determining unit determines that the individual identification information acquired by the acquiring unit was not acquired in the past, unique authentication information for each combination of the individual identification information and the product identification information. The information distribution apparatus includes a storing unit that stores the authentication information created by the creating unit and the user identification information in an associated manner in a predetermined storing device. The information distribution apparatus includes a deciding unit that decides, when the authentication information and the user identification information are received from a terminal device, whether the received authentication information and the received user identification information are stored an associated manner in the predetermined storing device. The information distribution apparatus includes a distributing unit that distributes, when it is decided by the deciding unit that the received authentication information and the received user identification information are stored in an associated manner in the predetermined storing device, content that is identified by product identification information that is associated with the authentication information to the terminal device.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a schematic diagram illustrating an example of information stored in an authentication history storing unit;

FIG. 6 is a schematic diagram illustrating an example of information stored in a user ID storing unit;

FIG. 7 is a schematic diagram illustrating an example of information stored in the authentication information storing unit;

FIG. 8 is a schematic diagram illustrating an example of the functional configuration of an advertising distribution server according to the embodiment;

FIG. 9 is a schematic diagram illustrating an example of information stored in an advertising storing unit;

FIG. 10 is a flowchart illustrating the flow of an information distribution process performed by the information distribution system according to the embodiment;

DETAILED DESCRIPTION OF THE PREFERRED EMBODIMENTS

Figure 1:
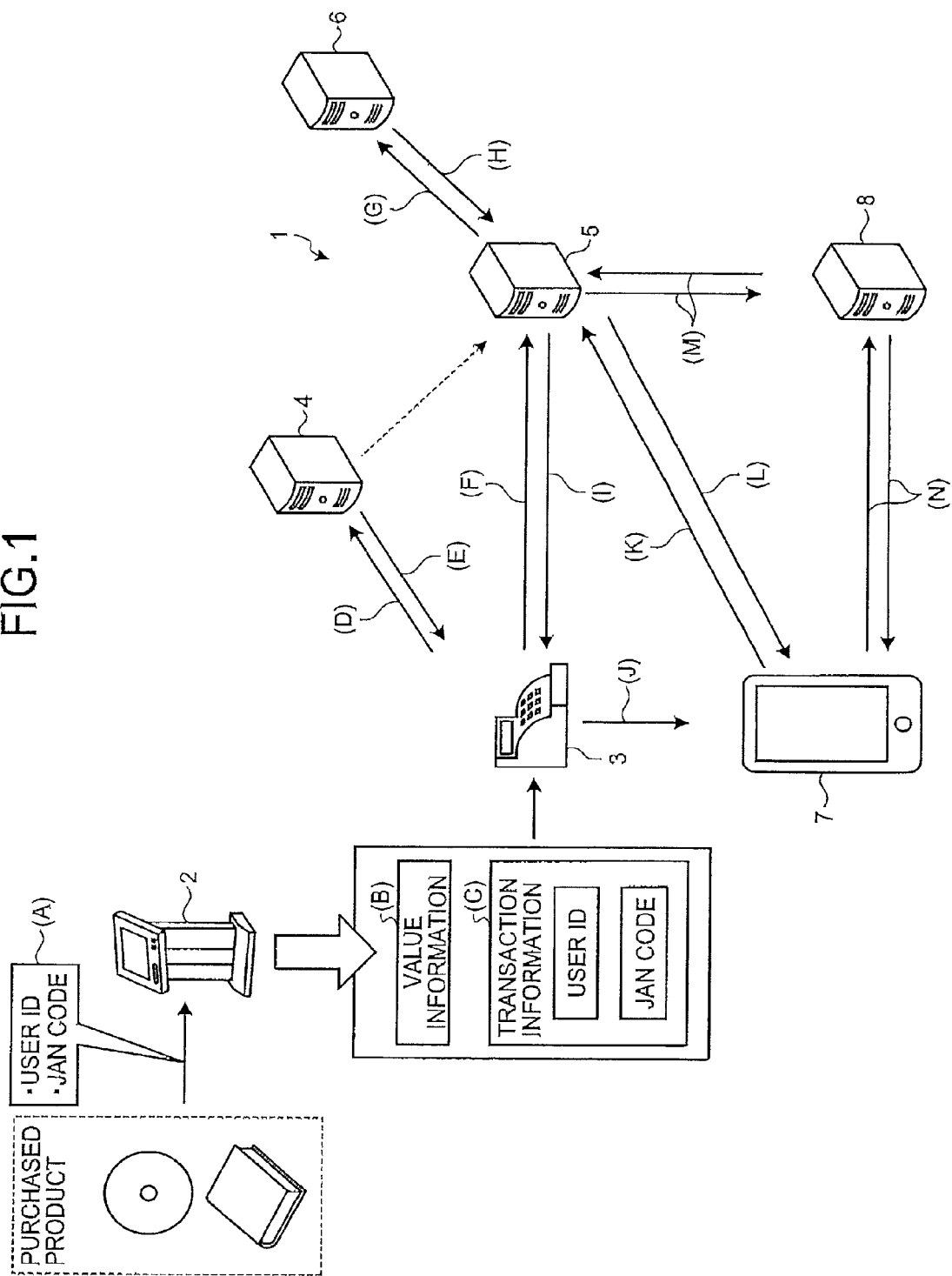
FIG. 1 is a schematic diagram illustrating an example of an information distribution system according to an embodiment.

A preferred embodiment (hereinafter, referred to as an "embodiment") of an information distribution apparatus, an information distribution system, an information distribution method, and an information distribution program will be described in detail below with reference to the accompanying drawings. The information distribution apparatus, the information distribution system, the information distribution method, and the information distribution program are not limited to the embodiment. Furthermore, in the embodiment described below, components having the same function are assigned the same reference numerals; therefore, any duplicated descriptions of such components are omitted.

1. Information Distribution System

In the following, an example of an information distribution system according to an embodiment will be described with reference to FIG. 1. FIG. 1 is a schematic diagram illustrating an example of an information distribution system according to the embodiment. In the example illustrated in FIG. 1, an information distribution system 1 includes an input terminal 2, a Point of Sale (POS) terminal 3, a settlement server 4, a distribution server 5, an individual identification server 6, a user terminal 7, and an advertising distribution server 8. The POS terminal 3, the settlement server 4, the distribution server 5, the individual identification server 6, and the advertising distribution server 8 are connected via an arbitrary network, such as the Internet, a local area network (LEN), a wide area network (WAN), or the like.

First, in the information distribution system 1 illustrated in FIG. 1, the input terminal 2 creates transaction information that is used when a user purchases a distribution content right. For example, the input terminal 2 illustrated in FIG. 1 is a terminal device that is installed at a store, such as a convenience store, a volume-sales home electrical appliance store, or the like. Furthermore, in accordance with the operation by the user, the input terminal 2 starts to create transaction information that is used for a settlement process. Specifically, the input terminal 2 requests, from the user, an input of both a user ID that indicates a user and product identification information that is used to identify the product owned by the user. For example, a request for an input of a JAN code of already purchased product may also be used as the product identification information. In the description below, an example will be given in which the information distribution system 1 uses a JAN code as the product identification information; however, the embodiment is not limited thereto. The JAN code is only an example of the product identification information. The information distribution system 1 can use any information as long as the information identifies another product owned by the user for example World Product Code (WPC), Universal Product Code and European Article Number (EAN).

When the user ID and the JAN code are input, the input terminal 2 creates transaction information that indicates the input user ID, the input JAN code, and value information that indicates the value for acquiring a right to receive distribution of content that is recorded in the product indicated by the JAN code. Then, the input terminal 2 outputs the created transaction information and the value information.

For example, as illustrated in (A) in FIG. 1, the input terminal 2 acquires both the user ID and the JAN code. Then, as illustrated in (G) in FIG. 1, the input terminal 2 identifies the value for acquiring the right to receive the distribution of the content that is recorded in the product indicated by the acquired JAN code and then prints the value information that indicates the identified value on a receipt.

Furthermore, the input terminal 2 creates transaction information that includes therein the acquired user ID and the JAN code and then, as illustrated in (C) in FIG. 1, prints the created transaction information on the receipt. For example, the input terminal 2 prints, as the transaction information on the receipt, a QR code (registered trademark) that includes both the user ID and the JAN code. Then, the input terminal 2 outputs the receipt on which the value information and the transaction information are printed.

The POS terminal 3 is a terminal device that performs an accounting process in a store. For example, the POS terminal 3 is a terminal device used for an accounting process and is installed in, for example, a convenience store or a volume-sales home electrical appliance store, and the POS terminal 3 has a function of performing a predetermined settlement process. The POS terminal 3 may also be an information processing apparatus, such as a desktop PC, a tablet PC, or a notebook PC. Here, the POS terminal 3 reads the receipt output from the input terminal 2 and performs a predetermined settlement process in accordance with the value information that is printed on the read receipt.

Furthermore, the POS terminal 3 requests, from a sales clerk or the like who operates the POS terminal 3, an input of individual identification information that is used for individual identification of a medium in which content is normally recorded. For example, the POS terminal 3 may also request, from a sales clerk, an input of a lot number as the individual identification information. In the example described below, the description will be given with the assumption that the information distribution system 1 uses a lot number as individual identification information; however, the embodiment is not limited thereto. Any arbitrary information may also be used as long as the information is used for individual identification of a medium in which content is normally recorded. Furthermore, when a lot number is input and when the settlement process is finalized, the POS terminal 3 extracts the user ID and the JAN code from the transaction information that is printed on the read receipt and then sends the extracted user ID, the extracted JAN code, and the input lot number to the distribution server 5. Then, the POS terminal 3 receives, from the distribution server 5, authentication information that is uniquely defined with respect to the combination of the lot number and the JAN code. Then, the POS terminal 3 prints the received authentication information on a receipt or the like and outputs the receipt.

For example, the POS terminal 3 reads value information that indicates "500 Yen". When the user pays "500 Yen", as illustrated in (D) in FIG. 1, the POS terminal 3 performs a settlement process by notifying the settlement server 4 that a payment has been made. Then, when the settlement process has been finalized and when the POS terminal 3 receives the settlement information from the settlement server 4, the POS terminal 3 requests, from a sales clerk or the like, the input of the lot number of the medium that is the purchased product. Then, as illustrated in (E) in FIG. 1, when the POS terminal 3 receives the settlement information from the settlement server 4 and when the lot number is input, the POS terminal 3 reads the user ID and the JAN code from the transaction information and then sends, as illustrated in (F) in FIG. 1, the read user ID, the read JAN code, and the lot number to the distribution server 5.

Thereafter, when the POS terminal 3 receives, for example, a "CI#1" as authentication information from the distribution server 5, the POS terminal 3 prints a QR code (registered trademark) or the like that includes therein the received authentication information "CI#1" on a receipt or the like and then outputs the receipt. The receipt on which such authentication information is printed is handed over to a user who purchased, in a normal way, a medium in which content is recorded, i.e., a product, and who created the transaction information using the input terminal 2.

As described above, by allowing the sales clerk or the like who operates the POS terminal 3 to input a lot number or the like, the POS terminal 3 can reduce the time and effort required for a user to input the lot number and can prevent unlawful authentication from being attached. Such unlawful authentication is obtained by unlawfully changing a lot number and then inputting the lot number. Specifically, when a lot number is input by a malicious user, authentication information may possibly be unlawfully given by unlawfully changing the lot number. Consequently, in the information distribution system 1, an input of information that is used for individual identification of a medium in which content is recorded is not performed by a user but is performed by the operator of the POS terminal 3. This makes it possible to prevent unauthorized authentication information from being given without reducing the user-friendliness.

The POS terminal 3 may also attach arbitrary identification information, such as a stamp indicating that authentication information has already been issued, to a medium of a product to which authentication information has been issued. As described above, when identification information, such as a stamp, is attached to a medium to which authentication information has been issued, it is possible to prevent reuse of the medium when authentication information is issued, and thus it is possible to prevent the authentication information from being unlawfully issued. Furthermore, as will be described later, when the settlement server 4 makes a settlement of a transaction in which a credit card is used, the POS terminal 3 may also perform the settlement process by reading credit card information on a user and sending both the value information and the credit card information to the settlement server 4. Furthermore, when the settlement server 4 makes a settlement of a transaction in which electronic money is used, the POS terminal 3 may also perform the settlement process by sending value information and by receiving settlement information.

The settlement server 4 is an information processing apparatus that performs the settlement process. For example, when the settlement server 4 receives a notification from the POS terminal 3 indicating that a payment has been performed, the settlement server 4 records the state as sales information and notifies the POS terminal 3 of the settlement information. In addition to a settlement process in which cash is used, the settlement server 4 may also perform a settlement process in which, for example, a credit card is used. For example, the Settlement server 4 acquires, from the POS terminal 3, value information and credit card information on a user; makes, by using the acquired credit card information, a settlement of the value price indicated by the acquired value information; and finalizes the sales. Thereafter, the settlement server 4 may also send settlement information to the POS terminal 3.

As described above, the information distribution system 1 includes the POS terminal 3 and the settlement server 4 that perform the settlement process. Consequently, in the information distribution system 1, the method of the settlement process performed when authentication information is issued can be flexibly changed. For example, in addition to the settlement process that is performed with the POS terminal 3, the settlement server 4 may also perform the settlement process in which, for example, electronic money, a credit card, or another arbitrary settlement method is used and, when a settlement has been, finalized, the settlement server 4 may also notify the POS terminal 3 or the distribution server 5 of this transaction.

The distribution server 5 receives a user ID, a JAN code, and a lot number from the POS terminal 3. Then, as illustrated in (G) in FIG. 1, the distribution server 5 sends the received lot number to the individual identification server 6 and requests that an authentication process be performed. Specifically, the distribution server 5 asks the individual identification server 6 to determine whether the received lot number is a lot number of a official product.

Then, as illustrated in (H) in FIG. 1, when the distribution server 5 receives, from the individual identification server 6, information indicating that the lot number is the lot number of a official product, the distribution server 5 determines whether the received lot number was received in the past. If it is determined that the received lot number was received in the past, the distribution server 5 performs the following process. First, the distribution server 5 creates authentication information that is uniquely defined from the combination of the JAN code and the lot number received from the POS terminal 3 and then stores therein the created authentication information by associating the authentication information with the user ID. Then, as illustrated in (I) in FIG. 1, the distribution server 5 sends the created authentication information to the POS terminal 3. Specifically, when a medium that stores therein already-purchased content is a official product and when authentication information has not been issued to the medium, the distribution server 5 attaches new authentication information to the already-purchased product.

Consequently, the distribution server 5 can issue authentication information that is associated with, on a one to one basis, a medium that is a official product. For example, when a user has media of official products, such as a normal version package and a special version package, both of which include the same content, the distribution server 5 attaches authentication information to each of the media. In this way, by issuing authentication information that is uniquely associated with the media, which are official products, the distribution server 5 can securely protect the use right of the content while maintaining user-friendliness.

Specifically, when multiple pieces of authentication information are recognized with respect to a single medium, because the medium may possibly be duplicated and different piece of authentication information may possibly be attached to each of the duplicated media, there may be a case in which the content is distributed and unlawfully received. However, because the distribution server 5 issues authentication information that is uniquely associated with a medium that is a official product and does not attach the authentication information to a duplicated medium, it is possible to prevent unlawful content from being distributed, thus protecting the use right of the content.

Furthermore, with the conventional techniques, even when a user purchases a medium in which content is normally recorded, in order to receive distribution of digital content that has the same content therein, the user is not able to receive the distribution of the digital content having the same content therein unless the user again purchases the use right of the content. Consequently, the user is not able to easily enjoy the content by allowing the same content as that purchased in the past as a product to be distributed to the user terminal. In contrast, the distribution server 5 issues authentication information that is uniquely associated with a medium that is a official product and, when the distribution server 5 receives authentication information from the user terminal 7, the distribution server 5 distributes the content. Consequently, with the distribution server 5, a user can easily receive the distribution of the content while the protection of the use right of the content is guaranteed.

Furthermore, when the distribution server 5 receives a notification indicating that the lot number is not a lot number of a official product, the distribution server 5 notifies the POS terminal 3 that authentication is not properly performed. Specifically, when the received lot number is not a lot number of a official product or when there is a history indicating that the lot number that is the same as that received has been received before, the distribution server 5 determines that authentication to be performed on the basis of a pirated version product or unlawfully duplicated product is required. Then, the distribution server 5 notifies the POS terminal 3 that the authentication was not properly performed.

In such a case, the POS terminal 3 does not output authentication information; prints, on a receipt or the like, information indicating that the authentication is not able to be performed; and then outputs the receipt. Furthermore, when the distribution server 5 receives a user ID and a JAN code from the POS terminal 3 before the sales is finalized, the distribution server 5 may also send a query to the settlement server 4 and create authentication information after the distribution server 5 confirms that the sales has been finalized.

Furthermore, when the distribution server 5 receives, from the user terminal 7, the authentication information and the user ID, the distribution server 5 determines whether the received authentication information and the user ID are stored in an associated manner. When the received authentication information and the user ID are stored in an associated manner, the distribution server 5 distributes, to the user terminal 7, the content indicated by the JAN code that is associated with the authentication information. Furthermore, the distribution server 5 notifies the advertising distribution server 8 of information that is related to the history of the content that was distributed by the distribution server 5 to the user terminal 7.

As described above, the distribution server 5 stores therein, in an associated manner, authentication information and a user ID and distributes content in accordance with whether the authentication information and the user ID received from the user terminal 7 are stored. Consequently, because the distribution server 5 distributes the content with respect to only a distribution request received from a user who is the owner of a medium to which the authentication information is attached, it is possible to distribute content handled by multiple devices to an owner of a medium while the content is further effectively protected.

The individual identification server 6 determines whether there is the history indicating that a lot number received from the distribution server 5 has already been received. For example, the individual identification server 6 stores therein, in advance, a lot number of a official product. When the individual identification server 6 receives a lot number from the distribution server 5, the individual identification server 6 determines whether the received lot number is a lot number of a official product and then notifies the distribution server 5 of the determination result. In this way, because the individual identification server 6 compares the lot number of a official product with the lot number of the medium to which authentication information will be issued, the individual identification server 6 can issue the authentication information to only the medium of a official product. Furthermore, the individual identification server 6 is, for example, a server managed by a content owner who has a use right of the content that is targeted for distribution. By storing therein only the lot number of the medium in which the content that is desired to be distributed by the content owner, the individual identification server 6 can easily control the distribution method or the use right of the content.

By sending a user ID and authentication information to the distribution server 5, the user terminal 7 receives distribution of content that is associated with the authentication information. For example, as illustrated in (J) in FIG. 1, a user inputs, to the user terminal 7, the authentication information, which is printed by the POS terminal 3 on a receipt, and the user ID of the user. In such a case, as illustrated in (K) in FIG. 1, the user terminal 7 sends the authentication information and the user ID to the distribution server 5. The user terminal 7 used here may also be a terminal device, such as a smart phone, a PDA, a tablet device, a notebook PC, a PC, or the like.

At this point, the distribution server 5 stores therein, in an associated manner, the user ID of a user who owns a official product and authentication information that is attached to a medium of a official product. Consequently, when the distribution server 5 stores therein, in an associated manner, the authentication information and the user ID received from the user terminal 7, the distribution server 5 determines that the user of the user terminal 7 is a legitimate user who owns a medium in which content targeted for the distribution is recorded.

Then, as illustrated in (L) in FIG. 1, the distribution server 5 distributes the content to the user terminal 7. Consequently, when the user is a legitimate user of the medium in which the content is recorded, the user terminal 7 can receive the distribution of the content from the distribution server 5 by paying a fee.

On the basis of the history of the content distributed by the distribution server 5 to the user terminal 7, the advertising distribution server 8 distributes the advertising information to the user terminal 7. For example, as illustrated in (M) in FIG. 1, the advertising distribution server 8 requests, from the distribution server 5, a history of content that was distributed for each user ID at predetermined time intervals and then acquires the history of the content distributed for each user ID from the distribution server 5.

Furthermore, the user terminal 7 accesses a web server (not illustrated) and acquires a web page that includes therein an instruction indicating that a user ID is to be sent to the advertising distribution server 8 by using the Hyper Text Markup Language (HTML) or a cookie. Then, in accordance with the instruction included in the acquired web page, the user terminal 7 sends the user ID to the advertising distribution server 8.

In such a case, the advertising distribution server 8 identifies the history of the content that is associated with the user ID received from the user terminal 7 and then sends the advertising information in accordance with the identified history to the user terminal 7. Consequently, as illustrated in (N) in FIG. 1, the user terminal 7 receives the advertising information from the advertising distribution server 8 and displays the received advertising information. In this way, because the advertising distribution server 8 distributes advertising information in accordance with the history of the content viewed or listened by a user, effective advertising information can be displayed on the user terminal 7. The advertising information in accordance with the history of the content mentioned here includes, in addition to advertising information that is directly related to the content, advertising information that is indirectly related to the content, such as advertising information that was frequently selected by other users who viewed or listened to the content that was viewed or listened to by the subject user.

Furthermore, before the user terminal 7 sends the user ID and the authentication information to the distribution server 5, the user terminal 7 may also perform a login process with respect to the distribution server 5. For example, the user terminal 7 sends the user ID and the password to the distribution server 5 and performs the login process. After the login was performed properly, the user terminal 7 may also send the user ID and the authentication information.

2. Functional Configuration of the Individual Identification Server

Figures 2, 3:
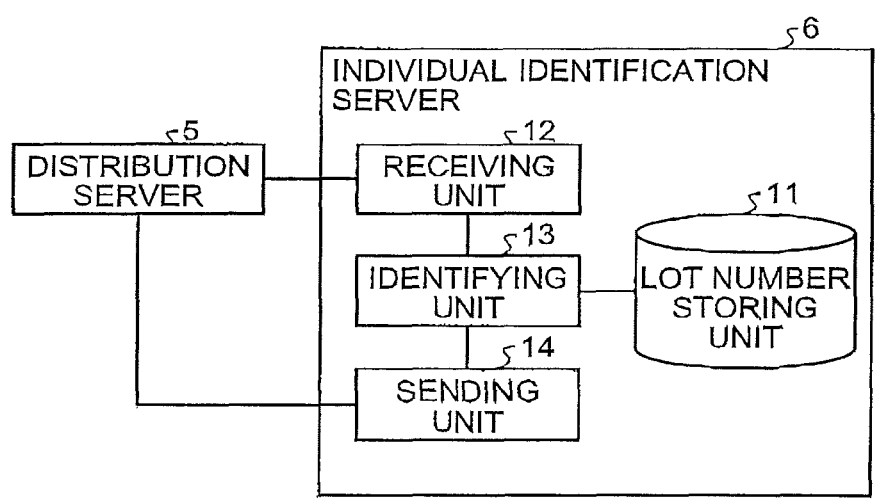
FIG. 2 is a schematic diagram illustrating an example of the functional configuration of an individual identification server according to the embodiment.
FIG. 3 is a schematic diagram illustrating an example of information stored by a lot number storing unit.

In the following, the functional configuration of the individual identification server 6 according to the embodiment will be described with reference to FIG. 2. FIG. 2 is a schematic diagram illustrating an example of the functional configuration of an individual identification server according to the embodiment. As illustrated, in FIG. 2, the individual identification server 6 includes a lot number storing unit 11, a receiving unit 12, an identifying unit 13, and a sending unit 14.

The lot number storing unit 11 stores therein, from among media in each of which content is recorded, a lot number attached to a official product. FIG. 3 is a schematic diagram illustrating an example of information stored by a lot number storing unit. As illustrated in FIG. 3, the lot number storing unit 11 stores therein, in an associated manner, a JAN code and a lot number. Specifically, from among the media in each of which content is recorded, the lot number storing unit 11 stores therein, for each piece of content, a lot number that is attached to a official product.

In the example illustrated in FIG. 3, the lot number storing unit 11 stores therein, in an associated manner, the JAN code "JAN#1" and the lot numbers "000001 to 999999". Specifically, from among the media in each of which content indicated by the JAN code "JAN#1" is recorded, the lot number storing unit 11 stores therein information indicating that media whose lot numbers are "000001 to 999999" are official products.

Furthermore, the lot number storing unit 11 stores therein, in an associated manner, the JAN code "JAN#2" and the lot numbers "000001 to 499999". Specifically, from among the media in each of which content indicated by the JAN code "JAN#2" is recorded, the lot number storing unit 11 stores therein information indicating that media whose lot numbers are "000001 to 499999" are official products.

Furthermore, the lot number storing unit 11 stores therein, in an associated manner, the JAN code "JAN#3" and the lot numbers "500000 to 999999". Specifically, from among the media in each of which content indicated by the JAN code "JAN#3" is recorded, the lot number storing unit 11 stores therein information indicating that media whose lot numbers are "500000 to 999999" are official products.

A description will be given here by referring back to FIG. 2. The receiving unit 12 receives a JAN code and a lot number from the distribution server 5. Then, the receiving unit 12 outputs the received JAN code and the lot number to the identifying unit 13.

When the identifying unit 13 receives the JAN code and the lot number from the receiving unit 12, the identifying unit 13 determines whether the combination of the received JAN code and the lot number is stored in the lot number storing unit 11. When the combination of the received JAN code and the lot number is stored in the lot number storing unit 11, the identifying unit 13 outputs a notification to the sending unit 14 indicating that the lot number is a lot number of a official product. In contrast, when the combination of the received JAN code and the lot number is not stored in the lot number storing unit 11, the identifying unit 13 outputs a notification to the sending unit 14 indicating that the lot number is not a lot number of a official product. Furthermore, the sending unit 14 sends a notification to the distribution server 5 indicating that the lot number is a lot number of a official product or indicating that the lot number is not a lot number of a official product.

3. Functional Configuration of the Distribution Server

Figure 4:
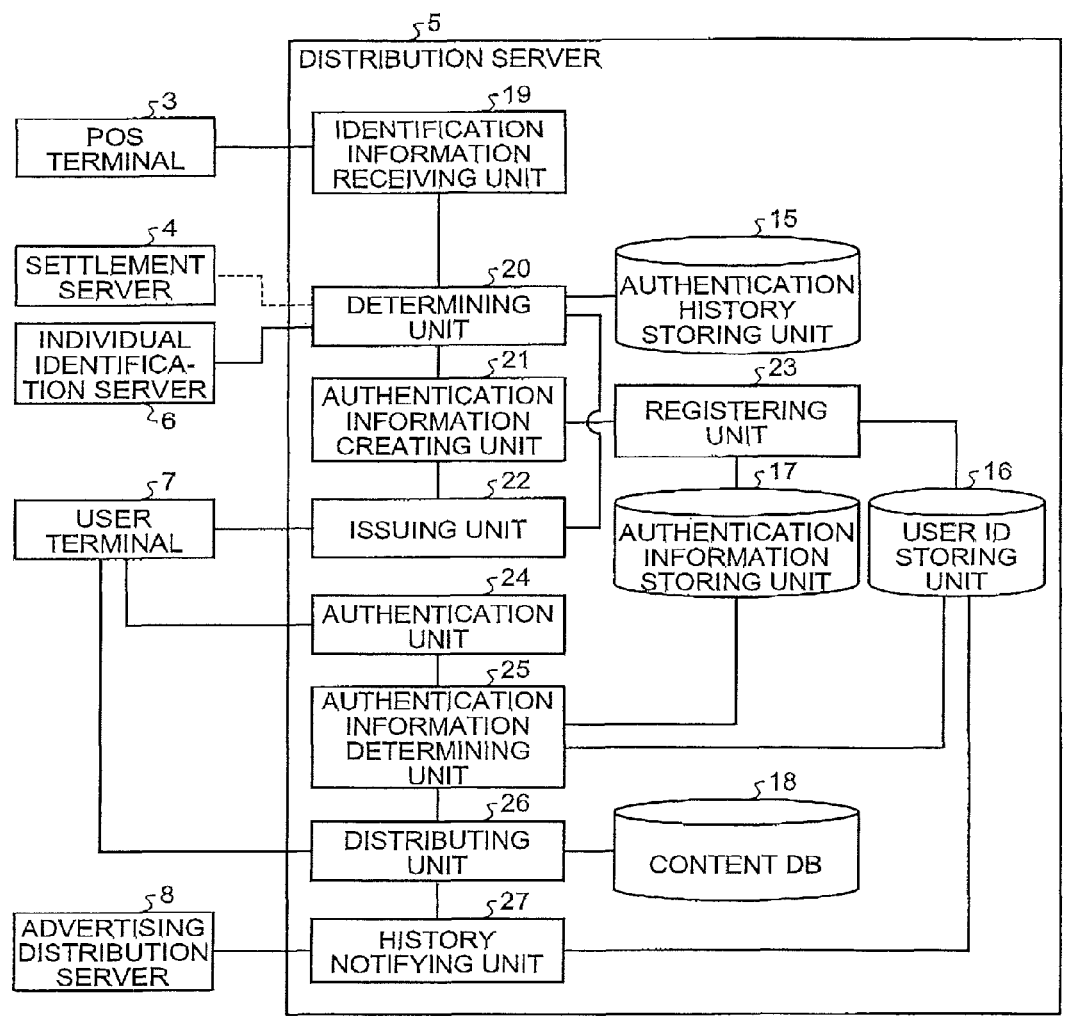
FIG. 4 is a schematic diagram illustrating an example of the functional configuration of a distribution server according to the embodiment.

In the following, the functional configuration of the distribution server 5 will be described with reference to FIG. 4. FIG. 4 is a schematic diagram illustrating an example of the functional configuration of a distribution server according to the embodiment. In the example illustrated in FIG. 4, the distribution server 5 includes an authentication history storing unit 15, a user ID storing unit 16, an authentication information storing unit 17, a content database (DB) 18, an identification information receiving unit 19, a determining unit 20, an authentication information creating unit 21, an issuing unit 22, and a registering unit 23. Furthermore, the distribution server 5 includes an authentication unit 24, an authentication information determining unit 25, a distributing unit 26, and a history notifying unit 27.

The authentication history storing unit 15 stores therein a history of the lot number of a medium to which authentication information is attached, i.e., a history of the lot number that was received from the distribution server 5 in the past. FIG. 5 is a schematic diagram illustrating an example of information stored in an authentication history storing unit. As illustrated in FIG. 5, the authentication history storing unit 15 stores therein, in an associated-manner, a JAN code and an authenticated lot number, i.e., a lot number of a medium that was received by the distribution server 5 in the past and that was subjected to authentication.

In the example illustrated in FIG. 5, the authentication history storing unit 15 stores therein, in an associated manner, the JAN code "JAN#1" and the authenticated lot number "500000". Specifically, from among the media in each of which content indicated by the JAN code "JAN#1" is recorded, the authentication history storing unit 15 stores therein a history of the medium whose lot number is "500000", indicating that the authentication information has already been attached.

Furthermore, the authentication history storing unit 15 stores therein, in an associated manner, the JAN code "JAN#2" and the authenticated lot number "500001". Specifically, from among the media in each of which content indicated by the JAN code "JAN#2" is recorded, the authentication history storing unit 15 stores therein a history of the medium whose lot number is "500001", indicating that the authentication information has already been attached.

Furthermore, the authentication history storing unit 15 stores therein, in an associated manner, the JAN code "JAN#3" and the authenticated lot number "596103". Specifically, from among the media in each of which content indicated by the JAN code "JAN#3", the authentication history storing unit 15 stores therein a history of the medium whose lot number is "596103", indicating that the authentication information has already been attached.

The user ID storing unit 16 stores therein, for each user ID, a JAN code that indicates content that is permitted to be distributed and a content ID that is attached to each medium in which content is stored. Here, different content IDs with different values are attached to physically different media even when the same content is stored in the media. Specifically, the content ID mentioned here is the identifier that is attached to each combination of content and a medium in which distribution of content has been authenticated.

FIG. 6 is a schematic diagram illustrating an example of information stored in a user ID storing unit. In the example illustrated in FIG. 6, the user ID storing unit 16 stores therein, in an associated manner, the user ID "U0001", the content ID "CID#1", and the JAN code "JAN#1". Specifically, the user ID storing unit 16 indicates that the content ID "CID#1" is attached to the medium that is owned by the user indicated by the user ID "U0001". Furthermore, the user ID storing unit 16 indicates that content indicated by the JAN code "JAN#1" is stored in the medium to which the content ID "CID#1" is attached.

Furthermore, the user ID storing unit 16 indicates that content ID "CID#3" is attached to the medium which is owned by the user indicated by the user ID "U0002" and in which the content indicated by the JAN code "JAN#3" is stored. Furthermore, the user ID storing unit 16 indicates that the content ID "CID#4" is attached to the medium which is owned by the user indicated by the user ID "U0003" and in which the content indicated by the JAN code "JAN#4" is stored.

A description will be given here by referring back to FIG. 4. The authentication information storing unit 17 stores therein authentication information for each content ID, i.e., for each medium in which content is stored. FIG. 7 is a schematic diagram illustrating an example of information stored in the authentication information storing unit. As illustrated in FIG. 7, the authentication information storing unit 17 stores therein, in an associated manner, a content ID and authentication information. For example, the authentication information storing unit 17 stores therein, in an associated manner, the content ID "CID#1" and the authentication information "CI#1". Specifically, the authentication information storing unit 17 indicates that the authentication information "CI#1" is attached to the medium indicated by the content ID "CID#1".

Similarly, the authentication information storing unit 17 indicates that the authentication information "CI#2" is attached to the medium indicated by the content ID "CID#2" and indicates that the authentication information "CI#3" is attached to the medium indicated by the content ID "CID#3". Furthermore, the authentication information storing unit 17 indicates that the authentication information "CI#4" is attached to the medium indicated by the content ID "CID#4".

A description will be given here by referring back to FIG. 4. The content DB 18 is a database that stores therein data on content distributed to the user terminal 7. For example, the content DB 18 stores therein, in an associated manner, each piece of content, a JAN code that indicates the content.

The identification information receiving unit 19 receives the user ID, the JAN code, and the lot number sent by the POS terminal 3. In such a case, the identification information receiving unit 19 outputs the received user ID, the JAN code, and the lot number to the determining unit 20.

The determining unit 20 determines whether there is a history indicating that the lot number received from the POS terminal 3 was received, in the past. Specifically, when the determining unit 20 receives a user ID, a JAN code, and a lot number from the identification information receiving unit 19, the determining unit 20 sends the combination of the received JAN code and the lot number to the individual identification server 6 and then requests that the authentication be performed.

When the determining unit 20 receives a notification from the individual identification server 6 indicating that the lot number is a lot number of a official product, the determining unit 20 accesses the authentication history storing unit 15 and determines whether the combination of the JAN code and the lot number received from the identification information receiving unit 19 is stored. When it is determined that the combination of the JAN code and the lot number received from the identification information receiving unit 19 is not stored, the determining unit 20 outputs, to the authentication information creating unit 21, the user ID, the JAN code, and the lot number received from the identification information receiving unit 19 and asks the authentication information creating unit 21 to create authentication information. In contrast, when the determining unit 20 receives a notification from the individual identification server 6 indicating that the lot number is not a lot number of a official product, or when the combination of the JAN code and the lot number received from the identification information receiving unit 19 is not stored in the authentication history storing unit 15, the determining unit 20 notifies the issuing unit 22 that the authentication has not been properly performed.

For example, the determining unit 20 receives the user ID "U0001", the JAN code "JAN#1", and the lot number "000001". In such a case, the determining unit 20 sends the JAN code "JAN#1" and the lot number "000001" to the individual identification server 6. At this point, because the combination of the JAN code "JAN#1" and the lot number "000001" is stored in the lot number storing unit 11, the individual identification server 6 notifies the determining unit 20 that the lot number is a lot number of a official product.

Then, the determining unit 20 determines whether the combination of the JAN code "JAN#1" and the lot number "000001" is stored in the authentication history storing unit 15. When the combination of the JAN code "JAN#1" and the lot number "000001" is not stored, the determining unit' 20 asks the authentication information creating unit 21 to create authentication information. Specifically, the determining unit 20 requests that new authentication information be attached to a normal medium in which content is recorded and to which authentication information has not been issued. The determining unit 20 requests that authentication information be created and stores the combination of the JAN code "JAN#1" and the lot number "000001" in the authentication history storing unit 15.

In contrast, when the determining unit 20 receives, for example, the user ID "U0001", the JAN code "JAN#1", and the lot number "500000", although the combination of the JAN code "JAN#1" and the lot number "500000" indicates the medium of a official product, the determining unit 20 determines that the combination has already been stored in the authentication history storing unit 15. Consequently, the determining unit 20 outputs a notification to the issuing unit 22 indicating that the authentication has not been performed properly.

The authentication information creating unit 21 receives the user ID, the JAN code, and the lot number from the determining unit 20. When the authentication information creating unit 21 is asked to create authentication information, the authentication information creating unit 21 creates unique authentication information for each combination of the received JAN code and the lot number. Then, the authentication information creating unit 21 outputs the created authentication information to the issuing unit 22 and outputs, to the registering unit 23, the user ID and the JAN code that are received from the determining unit 20 and the created authentication information.

When the issuing unit 22 receives the authentication information from the authentication information creating unit 21, the issuing unit 22 sends the received authentication information to the POS terminal 3. Specifically, the issuing unit 22 issues new authentication information to a normal medium in which content is recorded and to which authentication information has not been issued. In contrast, when the issuing unit 22 receives a notification from the determining unit 20 indicating that the authentication has not been performed properly, the issuing unit 22 sends a notification to the POS terminal 3 indicating that the authentication has not been performed properly.

When the registering unit 23 receives the authentication information created by the authentication information creating unit 21, the user ID, and the JAN code, the registering unit 23 creates a new content ID for each piece of the authentication information and then stores the user ID, the content ID, and the JAN code in the user ID storing unit 16. Furthermore, the registering unit 23 stores the created content ID and the authentication information in the authentication information storing unit 17. Specifically, the registering unit 23 associates the authentication information with the user ID and with the content.

The authentication unit 24 performs the login process with respect to the user terminal 7. For example, the authentication unit 24 stores therein, in an associated manner, a user ID and a password by which content can be distributed from the distribution server 5. Furthermore, when the authentication unit 24 receives the user ID and the password from the user terminal 7, the authentication unit 24 checks the received user ID and the password and then performs login authentication. When the login authentication with respect to the user terminal 7 is performed properly, the authentication unit 24 requests the sending of the authentication information from the user terminal 7. When the authentication unit 24 receives the authentication information from the user terminal 7, the authentication unit 24 outputs the received authentication information and the user ID to the authentication information determining unit 25.

The authentication information determining unit 25 determines whether the user ID storing unit 16 and the authentication information storing unit 17 store therein the combination of the authentication information and the user ID that are received from the user terminal 7. Specifically, when the authentication information determining unit 25 receives the authentication information and the user ID from the authentication unit 24, the authentication information determining unit 25 extracts, from the authentication information storing unit 17, the content ID that is associated with the received authentication information. Then, the authentication information determining unit 25 determines whether the combination of the extracted content ID and the received user ID is stored in the user ID storing unit 16.

When the combination of the extracted content ID and the received user ID is stored in the user ID storing unit 16, the authentication information determining unit 25 outputs, to the distributing unit 26, the JAN code that is associated with the combination of the extracted content ID and the received user ID. In contrast, when the received authentication information is not stored in the authentication information storing unit 17 or the received user ID or the content ID that is associated with the authentication information is not stored in the user ID storing unit 16, the authentication information determining unit 25 outputs a notification to the distributing unit 26 indicating that the authentication has not been properly performed.

In the following, a description will be given of an example of a process performed by the authentication information determining unit 25. The description will be given with the assumption that the user ID storing unit 16 stores therein the information illustrated in FIG. 6 and the authentication information storing unit 17 stores therein information illustrated in FIG. 7. For example, when the authentication information determining unit 25 receives the authentication information "CI#1" and the user ID "U0001", the authentication information determining unit 25 extracts, from the authentication information storing unit 17, the content ID "CID#1" that is associated with the authentication information "CI#1".

Furthermore, the authentication information determining unit 25 determines that the combination of the extracted content ID "CID#1" and the user ID "U0001" is stored in the user ID storing unit 16. Then, the authentication information determining unit 25 extracts the JAN code "JAN#1" that is associated with the combination of the content ID "CID#1" and the user ID "U0001" and then outputs the JAN code "JAN#1" to the distributing unit 26.

In contrast, when the authentication information determining unit 25 receives the authentication information "CI#3" and the user ID "U0001", the authentication information determining unit 25 extracts, from the authentication information storing unit 17, the content ID "CI#3" that is associated with the authentication information "CI#3". However, because the combination of the content ID "CID#3" and the user ID "U0001" is not stored in the user ID storing unit 16, the authentication information determining unit 25 outputs a notification to the distributing unit 26 indicating that the authentication has not been properly performed.

When the distributing unit 26 receives the JAN code from the authentication information determining unit 25, the distributing unit 26 reads data on the content indicated by the received JAN code from the content DB 18 and then sends the read data to the user terminal 7. Furthermore, when the distributing unit 26 receives a notification from the authentication information determining unit 25 indicating that the authentication has not been properly performed, the distributing unit 26 notifies the user terminal 7 that the authentication has not been properly performed. An example method for distributing data by the distributing unit 26 includes a method that allows the user terminal 7 to download data or to receive stream transmission.

The history notifying unit 27 acquires, in an associated manner, the JAN code of the data distributed by the distributing unit 26 and the user ID of the user who received the data distributed by the distributing unit 26 and then retains, in an associated manner, the acquired JAN code and the user ID. For example, the history notifying unit 27 acquires, from the authentication information determining unit 25 via the distributing unit 26, the JAN code and the user ID and then retains them. When the history notifying unit 27 receives, from the advertising distribution server 8, a request for a distribution history, the history notifying unit 27 sends the retained JAN code and the user ID to the advertising distribution server 8. Specifically, the history notifying unit 27 sends the history of the content that was viewed or listened by each user to the advertising distribution server 8.

4. Functional Configuration of the Advertising Distribution Server

In the following, the functional configuration of the advertising distribution server 8 will be described with reference to FIG. 8. FIG. 8 is a schematic diagram illustrating an example of the functional configuration of an advertising distribution server according to the embodiment. In the example illustrated in FIG. 8, the advertising distribution server 8 includes an advertising storing unit 28, a history acquiring unit 29, a web request receiving unit 30, a user information acquiring unit 31, an advertising acquiring unit 32, and an advertising distribution unit 33.

The advertising storing unit 28 stores therein, in an associated manner, a JAN code and advertising information that is related to the content indicated by the JAN code. For example, as illustrated in FIG. 9, the advertising storing unit 28 stores therein, in an associated manner, the advertising information and the JAN code. FIG. 9 is a schematic diagram illustrating an example of information stored in an advertising storing unit. For example, as illustrated in FIG. 9, the advertising storing unit 28 stores therein, in an associated manner, the advertising information "AD#1" and the JAN code "JAN#1"; the advertising information "AD#2" and the JAN code "JAN#2"; the advertising information "AD#3" and the JAN code "JAN#3"; and the advertising information "AD#4" and the JAN code "JAN#4".

A description will be given here by referring back to FIG. 8. The history acquiring unit 29 sends a request for a request for a distribution history to the distribution server 5 at a predetermined timing. For example, the history acquiring unit 29 sends a request for a distribution history to the distribution server 5 at predetermined time intervals. When the history acquiring unit 29 receives, from the distribution server 5, the combination of a JAN code and a user ID, i.e., the history of the content that was viewed or listened by each user, the history acquiring unit 29 retains the received data.

When the history acquiring unit 29 receives a user ID from the user information acquiring unit 31, the history acquiring unit 29 outputs, to the user information acquiring unit 31, the JAN code associated with the received user ID, i.e., the history of the content viewed or listened by the user indicated by the received user ID.

When the web request receiving unit 30 receives a web request from the user terminal 7, the web request receiving unit 30 analyzes the received request and extracts the user ID of the user who uses the user terminal 7. Then, the web request receiving unit 30 outputs the extracted user ID to the user information acquiring unit 31.

For example, the user terminal 7 acquires, from a web server (not illustrated), data of a web page including a transmission instruction for sending the web request that includes a user ID to the advertising distribution server 8. Then, when the user terminal 7 performs rendering on the web page, the user terminal 7 sends the web request that includes the user ID to the advertising distribution server 8. In such a case, the web request receiving unit 30 extracts the user ID from the received web request and then outputs the extracted user ID to the user information acquiring unit 31.

The user information acquiring unit 31 acquires the history indicating that the content was viewed or listened by the user that is indicated by the user ID received by the web request receiving unit 30. Specifically, when the user information acquiring unit 31 receives the user ID from the web request receiving unit 30, the user information acquiring unit 31 outputs the acquired user ID to the history acquiring unit 29 and receives the JAN code that indicates the view history of the user that is indicated by the received user ID. Then, the user information acquiring unit 31 outputs the received JAN code to the advertising acquiring unit 32.

When the advertising acquiring unit 32 receives a JAN code from the user information acquiring unit 31, the advertising acquiring unit 32 acquires the advertising information that is associated with the JAN code from the advertising storing unit 28 and then outputs the acquired advertising information to the advertising distribution unit 33. For example, when the advertising acquiring unit 32 receives the JAN code "JAN#1" from the user information acquiring unit 31, the advertising acquiring unit 32 extracts the advertising information "AD#1" associated with the JAN code "JAN#1" from the advertising storing unit 28. Then, the advertising acquiring unit 32 outputs the advertising information "AD#1" to the advertising distribution unit 33.

The advertising distribution unit 33 sends the advertising information received from the advertising acquiring unit 32 to the use terminal 7. Specifically, the advertising distribution unit 33 sends the advertising information associated with the history of the content viewed or listened by the user of the user terminal 7 to the user terminal 7.

5. Flow of a Distribution Process

In the following, the flow of the information distribution process performed by the information distribution system 1 according to the embodiment will be described with reference to FIG. 10. FIG. 10 is a flowchart illustrating the flow of an information distribution process performed by the information distribution system according to the embodiment.

As illustrated in FIG. 10, first, the input terminal 2 receives an input of a user ID and a JAN code (Step S101). Then, the input terminal 2 outputs value information and transaction information (Step S102).

Figure 11:
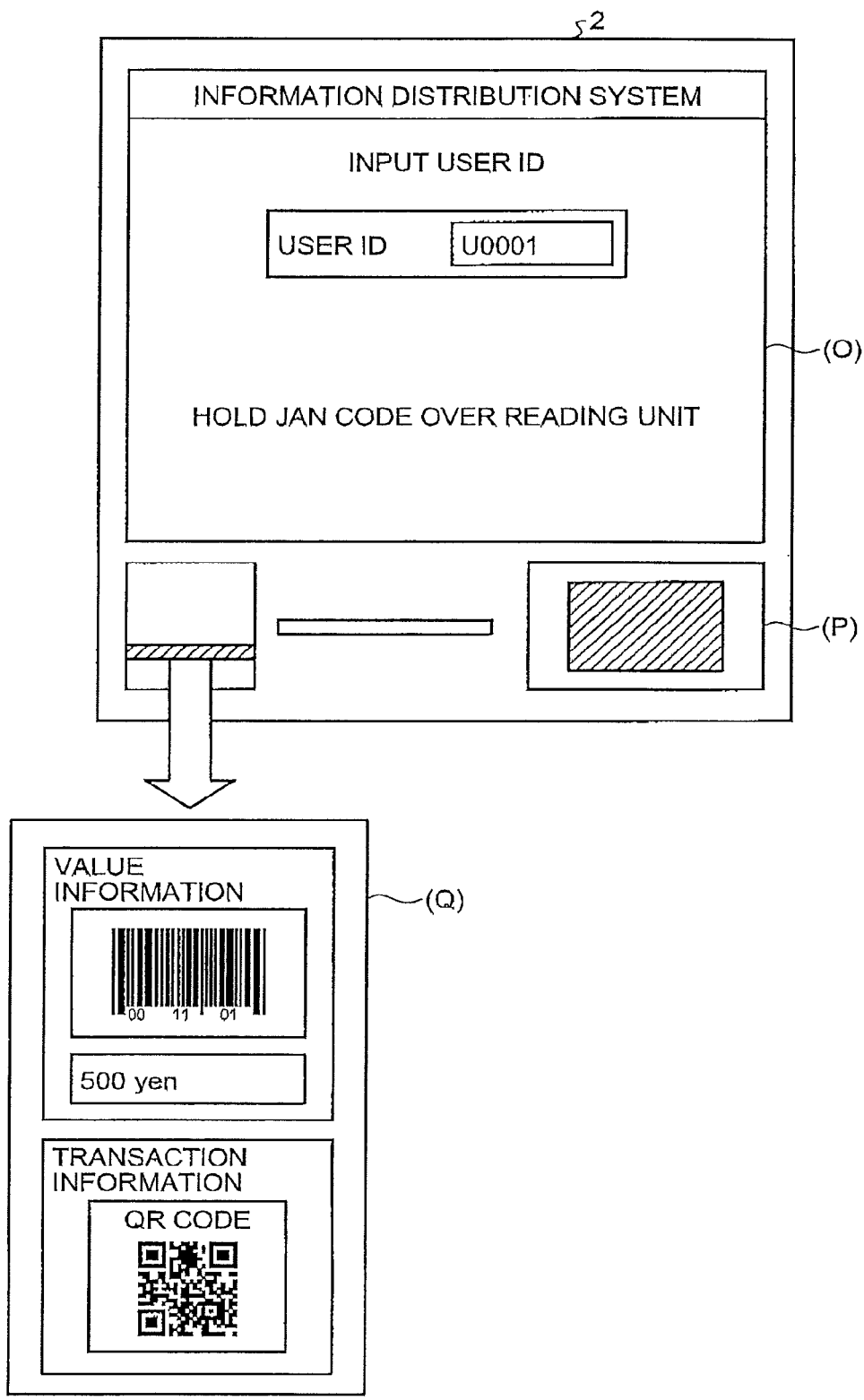
FIG. 11 is a schematic diagram illustrating an example of a screen displayed by an input terminal according to the embodiment.

FIG. 11 is a schematic diagram illustrating an example of a screen displayed by an input terminal according to the embodiment. For example, as illustrated in (O) in FIG. 11, the input terminal 2 displays a screen of the information distribution system. Furthermore, the input terminal 2 makes a request for an input of the user ID and displays a message to prompt a user to hold the JAN code over a barcode reader illustrated in (P) in FIG. 11, whereby requesting an input of the JAN code.

Figure 12:
FIG. 12 is a schematic diagram illustrating an example of an output process performed on authentication information.

When the user ID and the JAN code are input, the input terminal 2 outputs a receipt, as illustrated in (Q) in FIG. 12, on which the value information and the transaction information are printed. For example, as illustrated in (Q) in FIG. 12, the input terminal 2 prints, as the value information, the barcode that indicates the value for the settlement performed by the POS terminal 3 and then outputs, as transaction information, the receipt on which the QR code (registered trademark) that includes information on the user ID and the JAN code is printed.

If the user is not registered as a system user in the information distribution system 1, the input terminal 2 may also display a registration screen for the user before displaying the screen illustrated in FIG. 11. On such a registration screen, an input of, for example, a user ID and a password is requested. The input user ID and the password are used when the authentication unit 24 performs a login process.

A description will be given here by referring back to FIG. 10. When the value information and the transaction information that are output at Step S102 are input, the POS terminal 3 requests an input of a lot number from an operator, such as a sales clerk or the like (Step S103). When the lot number is input, the POS terminal 3 sends the value information to the settlement server 4 in order to perform the settlement process (Step S104). Then, after the settlement has been finalized, via the POS terminal 3, by using information on the settlement in which money has been received or in which a credit card is used, the settlement server 4 sends the settlement information to the POS terminal 3 (Step S105).

Then, the POS terminal 3 sends the user ID, the JAN code, and the lot number to the distribution server 5 (Step S106). In such a case, the distribution server 5 requests, from the individual identification server 6, authentication of the already-purchased product by using the lot number and the JAN code, i.e., the authentication of a medium owned by a user (Step S107). Furthermore, by using the lot number and the JAN code, the individual identification server 6 performs authentication by determining whether the product is a official product (Step S108).

When the authentication in which it is determined whether the product is a official product has been properly performed, the distribution server 5 determines whether the authentication information that is uniquely defined to the combination of the received JAN code and the lot number is unissued (Step S109). When the authentication information that is uniquely defined to the combination of the received JAN code and the lot number is unissued, the distribution server 5 creates authentication information (Step S110) and sends the authentication information to the POS terminal 3 (Step S111). Furthermore, the distribution server 5 stores therein, in an associated manner, the authentication information and the user ID (Step S112). The distribution server 5 may also perform the processes at Steps S110 and S111 in the inverse order.

In contrast, when the POS terminal 3 receives the authentication information, the POS terminal 3 outputs the received authentication information (Step S113). For example, as illustrated in FIG. 12, the POS terminal 3 outputs the receipt on which the QR code (registered trademark) that includes therein the authentication information is printed. FIG. 12 is a schematic diagram illustrating an example of an output process performed on authentication information. A description will be given here by referring back to FIG. 10. When the authentication information that was output at Step S112 is input, the user terminal 7 logs into the distribution server 5 and then sends the authentication information and the user ID to the distribution server 5 (Step S114).

An example of the process for inputting authentication information to the user terminal 7 may include a process that images, by the user terminal 7, the QR code (registered trademark) illustrated in FIG. 12 as example and then extracts the authentication information from the imaged QR code (registered trademark).

Figure 13:
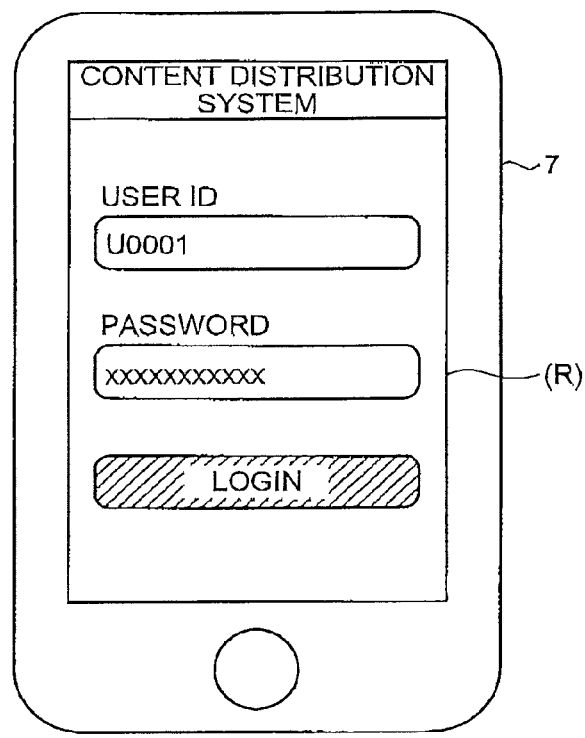
FIG. 13 is a schematic diagram illustrating an example of a screen displayed by a user terminal at the time of login.

FIG. 13 is a schematic diagram illustrating an example of a screen displayed by a user terminal at the time of login. For example, as illustrated in (F) in FIG. 13, the user terminal 7 requests an input of a user ID and a password. When a user presses (touches) a "login" button, the user terminal 7 sends the user ID and the password to the distribution server 5, whereby a login is performed.

Figure 14:
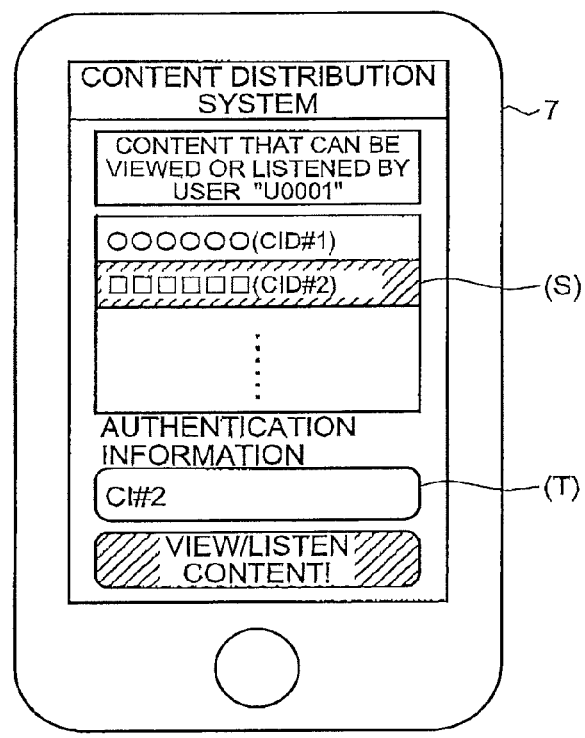
FIG. 14 is a schematic diagram illustrating an example of a screen displayed by the user terminal when authentication information is sent.

FIG. 14 is a schematic diagram illustrating an example of a screen displayed by the user terminal when authentication information is sent. For example, as illustrated in (S) in FIG. 14, the user terminal 7 displays content that can be viewed or listened by the logged in user. Specifically, this is implemented such that the user terminal 7 acquires the content ID that is associated with the user ID from the distribution server 5 after the login and then displays the content indicated by the acquired content. Then, as illustrated in (T) in FIG. 14, the user terminal 7 makes a request for an input of the authentication information that is associated with the selected user ID. After the authentication information is input and the button represented by "VIEW/LISTEN CONTENT!" is pressed (touched), the authentication information is sent to the distribution server 5.

A description will be given here by referring back to FIG. 10. When the distribution server 5 receives the authentication information and the user ID from the user terminal 7, the distribution server 5 determines whether the received authentication information and the user ID are stored in an associated manner (Step S115). When the received authentication information and the user ID are stored in an associated manner, the distribution server 5 distributes the content that is associated with the authentication information to the user terminal 7 (Step S116).

6. Modification

The information distribution system 1 according to the embodiment described above may also be implemented with various kinds of embodiments other than the embodiment described above. Therefore, in the following, another embodiment of the information distribution system 1 will be described.

6-1. Input Terminal 2

In the embodiment described above, the POS terminal 3 reads the value information and the transaction information that are output from the input terminal 2; however, the embodiment is not limited thereto. For example, the function performed by the input terminal 2 may also be performed by the user terminal 7.

Figure 15:
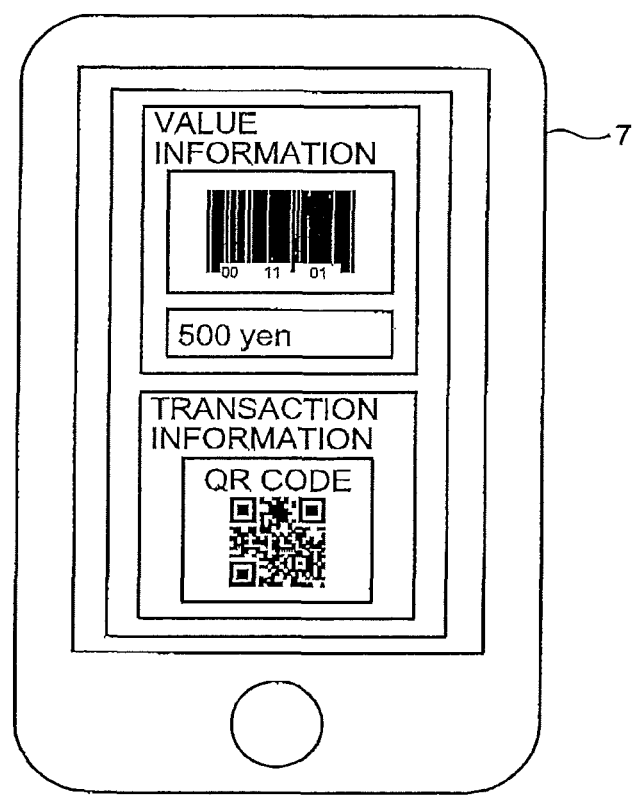
FIG. 15 is a schematic diagram illustrating a modification of the function of the user terminal.

FIG. 15 is a schematic diagram illustrating a modification of the function of the user terminal. For example, by using the function of a distributed application, the user terminal 7 performs an input of a user ID and the reading of the JAN code of the medium that is used by the user. Then, by using the input user ID and the input JAN code, the user terminal 7 displays the input value information and the transaction information. Thereafter, the POS terminal 3 reads the value information and the transaction information displayed by the user terminal 7, whereby the function performed by the input terminal 2 may also be performed by the user terminal 7.

6-2. Advertising Information

Figure 16:
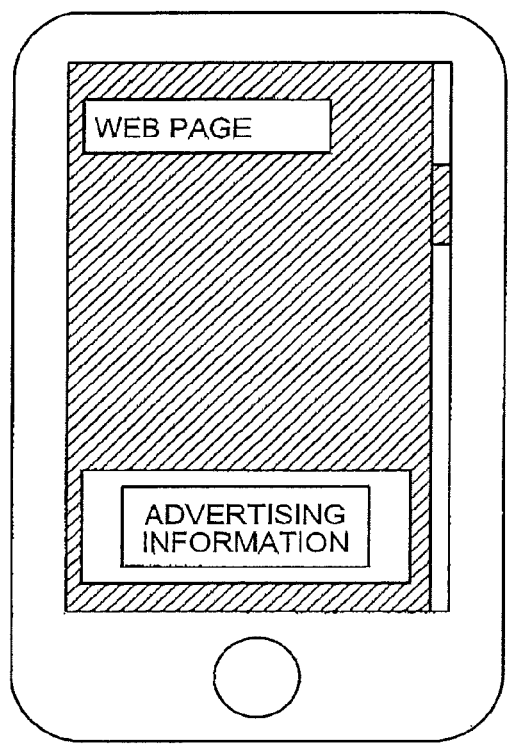
FIG. 16 is a schematic diagram illustrating an example of advertising information displayed by the user terminal.

FIG. 16 is a schematic diagram illustrating an example of advertising information displayed by the user terminal. For example, the user terminal 7 acquires a web page that includes a display frame in which advertising information is displayed within the display frame. At this point, the display frame for the advertising information includes therein, for example, a script in which an instruction to send the user ID to the advertising distribution server 8 and display the acquired advertising information is stored. In such a case, the user terminal 7 sends the user ID to the advertising distribution server 8 and displays, within the specified display frame for the advertising information, the advertising information received from the advertising distribution server 8, i.e., the advertising information in accordance with the history of the content viewed by the user of the user terminal 7. Consequently, for example, the user terminal 7 can display the advertising information in accordance with the content that the user is currently interested in.

6-3. Information Used by the Individual Identification Server 6

In the embodiment described above, the individual identification server 6 authenticates a medium owned by a user by using the JAN code and the lot number; however, the embodiment is not limited thereto. For example, if lot numbers are less likely to be overlapped with each other for each content, the individual identification server 6 determines, by using only the lot numbers, whether a medium owned by a user is normally purchased and whether authentication information has not been issued.

Furthermore, in order to further securely protect content, the individual identification server 6 content may, also use information that is acquired for each medium in which the content is recorded. For example, the individual identification server 6 may also use analog information that can be obtained from the content recorded in the medium as certification information.

Figure 17:
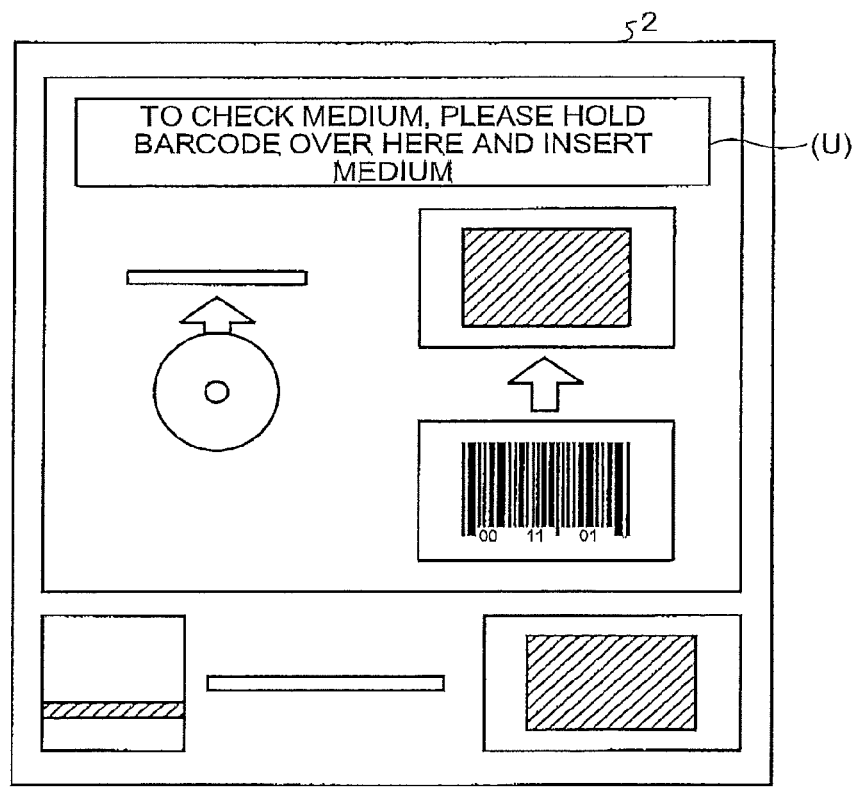
FIG. 17 is a schematic diagram illustrating a screen displayed by the input terminal when certification information is acquired.

In the following, a description will be given of a process in which the individual identification server 6 authenticates a medium by using certification information. FIG. 17 is a schematic diagram illustrating a screen displayed by the input terminal when certification information is acquired. The description below will be given with the assumption that a medium that is targeted for the authentication is an optical media, such as a CD, a DVD, a BD, or the like.

For example, as illustrated in (U) in FIG. 17, when the input terminal 2 inputs the JAN code, the input terminal 2 requests that an optical media be inserted. When the optical media is inserted, the input terminal 2 reads information that is recorded at a predetermined position in the inserted optical media. At this point, in a typical read process, when reading an optical media, such as a CD, a DVD, a BD, or the like, in which physical bits indicating digital information is recorded, the read analog information is converted to digital information by using a threshold process or the like.

However, the input terminal 2 according to the embodiment creates certification information by using the read analog signal. For example, the input terminal 2 creates, as the certification information, information that indicates the difference between the read analog signal and an ideal signal waveform, such as a digital signal read by using the threshold process. At this point, because the certification information created by using such an analog signal varies depending on the use state of an optical media, the value varies for each medium.

Thereafter, the input terminal 2 sends the certification information to the distribution server 5 together with the JAN code and the lot number. In contrast, the distribution server 5 stores, in the authentication history storing unit 15, the combination of the JAN code, the lot number, and the certification information that are received in the past. When a notification is received from the individual identification server 6 indicating that the medium of the combination of the received JAN code and the lot number is a official product, the distribution server 5 determines, on the basis whether the combination of the received JAN code, the lot number, and the certification information is stored in the authentication history storing unit 15, whether the authentication information with respect to the medium owned by the user has already been issued. When the distribution server 5 does not store the combination of the received JAN code, the lot number, and the certification information, the distribution server 5 creates certification information and stores the combination of the received JAN code, the lot number, and the certification information in the authentication history storing unit 15. Furthermore, the distribution server 5 may also read bleeding of ink on a book and then create certification information on the basis of the read information.

6-4. Additional

Furthermore, in the embodiment described above, the function performed by the individual identification server 6 may also be performed by the distribution server 5. Specifically, similarly to the individual identification server 6, the server that manages a lot number of a official, product is usually a server that is owned by a user who has a use right of content and the server that is different from the server that distributes content. However, in the embodiment described above, there is no need to separate the function performed by the individual identification server 6 and the function performed by the distribution server 5. The functions may also be integrated into a single server.

Furthermore, in the embodiment described above, the distribution server 5 includes the user ID storing unit 16 and the authentication information storing unit 17; however, the embodiment is not limited thereto. For example, the distribution server 5 may also store, in an associated manner in a single storage device, a user ID, a content ID, a JAN code, and authentication information.

Furthermore, the functions performed by the settlement server 4, the distribution server 5, the individual identification server 6, and the advertising distribution server 8 may also be implemented by multiple server devices by using cloud computing. For example, the functions performed by the identification information receiving unit 19, the determining unit 20, the authentication information creating unit 21, the issuing unit 22, the registering unit 23, the authentication unit 24, the authentication information determining unit 25, the distributing unit 2G, and the history notifying unit 27 that are included in the distribution server 5 may also be implemented by different server devices. Furthermore, each of the functions performed by each of the units 19 to 27 may also be appropriately integrated or separated.

Furthermore, in the embodiment described above, the description has been given in a case in which the user terminal 7 is a terminal, such as a smart phone or the like; however, the user terminal 7 described above is not limited to the smart phone or the like as long as the user terminal 7 is a display processing unit that can display various kinds of information. For example, the user terminal 7 may also be a tablet PC, a notebook PC, a desktop PC, a personal digital assistant (PDA), or the like. Furthermore, the user terminal 7 may also be a television set that works with digital signage or digital broadcasting. Furthermore, in addition to the example of the settlement process described above, the POS terminal 3 can perform the settlement process using an arbitrary method by itself or in cooperation with the settlement server 4.

Of the processes described in the embodiment, all or a part of the processes that are mentioned as being automatically performed can be manually performed, or all or a part of the processes that are mentioned as being manually performed can be automatically performed using known methods. Furthermore, the flow of the processes, the specific names, and the information containing various kinds of data or parameters indicated in the above specification and drawings can be arbitrarily changed unless otherwise stated.

For example, the various kinds of information illustrated in the drawings are not limited to the illustrated information. Furthermore, for example, the QR codes (registered trademark) or the barcodes illustrated in the drawings are not limited thereto. For example, a typical character string may also be used. Furthermore, a user ID is used as user identification information, a JAN code is used as product identification information, and a lot number is used as individual identification information; however, they are used as only examples. The information distribution system 1 may also use arbitrary information that can be used as user identification information, product identification information, or individual identification information.

The components of each unit illustrated in the drawings are only for conceptually illustrating the functions thereof and are not always physically configured as illustrated in the drawings. In other words, the specific shape of a separate or integrated device is not limited to the drawings. Specifically, all or part of the device can be configured by functionally or physically separating or integrating any of the units depending on various loads or use conditions. Furthermore, the function performed by each unit may also be implemented by a central processing unit (CPU) executing a predetermined information distribution program.

7. Advantages

As described above, the distribution server 5 according to the embodiment acquires a lot number, a JAN code, and a user ID and then determines whether the acquired lot number was acquired in the past. When the acquired lot number was acquired in the past, the distribution server 5 creates unique authentication information for each combination of a lot number and a JAN code and stores, in an associated manner, the created authentication information and the user ID. When the distribution server 5 stores therein, in an associated manner, the user ID and the authentication information received from the user terminal 7, the distribution server 5 sends, to the user terminal 7, the content indicated by the JAN code that is associated with the authentication information.

Accordingly, the distribution server 5 can distribute, to the user who purchased the medium in which the content is recorded, the digital content that has the same content as that recorded in the purchased product while ensuring the use right of the content is protected. Specifically, the distribution server 5 recognizes the medium to which authentication information has already been issued as an unlawful medium and thus the distribution server 5 does not issue authentication information. In contrast, for the medium to which authentication information has not been issued, the distribution server 5 issues authentication information. Consequently, the distribution server 5 can distribute the content to a user who owns a normal medium.

Specifically, the distribution server 5 issues authentication information that is uniquely associated with a medium that is a official product. When a user has multiple media that are official products and each of which includes therein the same content, the distribution server 5 also attaches authentication information to each of the media. Consequently, by issuing authentication information that is uniquely associated with a medium, which is a official product, the distribution server 5 can securely protect the use right of the content. Furthermore, when the distribution server 5 issues authentication information that is uniquely associated with a medium that is a official product and receives authentication information from the user terminal 7, the distribution server 5 distributes content. Consequently, with the distribution server 5, a user can easily receive the distribution of the content while the protection of the use right of the content is guaranteed.

Furthermore, the individual identification server 6 determines whether there is any history indicating that the combination of a lot number and certification information that was created by using analog information that is unique to a medium was acquired in the past. Consequently, the individual identification server 6 can prevent authentication information with respect to unlawful authentication, such as a change in a lot number or the like, from being issued.

Furthermore, the distribution server 5 provides the advertising distribution server 8 with information related to the history of distributing content to the user terminal 7. Consequently, the information distribution system 1 displays, on the user terminal 7, the advertising information related to the content that was viewed by the user.

Furthermore, the individual identification server 6 further determines, by using a lot number, whether a medium owned by a user is a official product. Consequently, when a medium that is not a official product or a lot number that was input to the POS terminal 3 has bee unlawfully changed, the individual identification server 6 can prevent authentication information from being issued.

In the above, embodiments have been described; however the embodiments are described only by way of an example. In addition to the embodiment, various modifications and changes can be made in accordance with the knowledge of those skilled in the art.

Furthermore, "unit" described in claims can be read as a "component (section, module, means)" or a "circuit". For example, acquiring means can be read as an acquiring unit or an acquiring circuit.

According to an aspect of an embodiment of the present invention, it is possible to distribute, to a user who already owns content, a medium having the same content, while the protection of the use right of the content is secured.

According to an aspect of an embodiment of the present invention, an object thereof is to digitally distribute content to a user who already has the same content in a physical medium, while securing the use right of the content is protected.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information distribution system comprising:
   a user terminal device including a processor programmed to:
      when receiving: (i) product identification information used for product identification of a medium in which content is normally recorded, and (ii) user identification information identifying a user, output an image in which the product identification information and the user identification information are included;
a Point of Sale (POS) terminal including a processor programmed to:
when receiving the outputted image of the user terminal device and individual identification information used for individual identification of the medium, send the product identification information and the user identification information, which are included in the image, and the individual identification information; and
perform a predetermined settlement process; and
an information distribution apparatus including a processor programmed to:
acquire the individual identification information, the product identification information, the user identification information, and certification information that is unique information obtained from medium in which the content is recorded;
determine whether the combination of acquired individual identification information and the certification information was acquired in the past;
when the combination of the acquired individual identification information and the certification information are determined not to be acquired in the past, create unique authentication information for each combination of the individual identification information and the product identification information;
send the created authentication information to the POS terminal;
store the created authentication information and the user identification information in an associated manner in a predetermined storing device;
when the authentication information and the user identification information are received from the user terminal device, determine whether the received authentication information and the received user identification information are stored in the associated manner in the predetermined storing device; and
when the received authentication information and the received user identification information are determined to be stored in the predetermined storing device in the associated manner, distribute content identified by product identification information that is associated with the authentication information to the user terminal device.

2. The information distribution system according to claim 1, wherein the processor of the information distribution apparatus is programmed to:
acquire the certification information that is created by using analog information that is unique to the medium in which the content is recorded.

3. The information distribution system according to claim 1, wherein the processor of the information distribution apparatus is programmed to provide information to an advertising device that distributes advertising information to the terminal device, the information being related to a history of distribution performed by the information distribution apparatus.

4. The information distribution system according to claim 1, wherein the processor of the information distribution apparatus is programmed to determine whether the content is a normally sold content based on the acquired individual identification information.

5. An information distribution system comprising:
a store counter terminal device including a processor programmed to:
when receiving: (i) product identification information used for product identification of a medium in which content is normally recorded, and (ii) user identification information identifying a user, output an image in which the product identification information and the user identification information are included;
a Point of Sale (POS) terminal including a processor programmed to:
when receiving the outputted image of the store counter terminal device and individual identification information used for individual identification of the medium, send the product identification information and the user identification information, which are included in the image, and the individual identification information; and
perform a predetermined settlement process; and
an information distribution apparatus including a processor programmed to:
acquire the individual identification information, the product identification information, and the user identification information, and certification information that is unique information obtained from medium in which the content is recorded;
determine whether the combination of acquired individual identification information and the certification information was acquired in the past,
when the combination of the acquired individual identification information and the certification information are determined not to be acquired in the past, create unique authentication information for each combination of the individual identification information and the product identification information;
send the created authentication information to the POS terminal;
store the created authentication information and the user identification information in an associated manner in a predetermined storing device;
when the authentication information and the user identification information are received from a user terminal device, determine whether the received authentication information and the received user identification information are stored in the associated manner in the predetermined storing device; and
the received authentication information and the received user identification information are stored in the predetermined storing device in the associated manner, distribute content identified by product identification information that is associated with the authentication information to the user terminal device.

6. The information distribution system according to claim 5, wherein the processor of the information distribution apparatus is programmed to:
acquire certification information that is created by using analog information that is unique to the medium in which the content is recorded.

7. The information distribution system according to claim 5, wherein the processor of the information distribution apparatus is programmed to provide information to an advertising device that distributes advertising information to the terminal device, the information being related to a history of distribution performed by the information distribution apparatus.

8. The information distribution system according to claim 5, wherein the processor of the information distribution apparatus is programmed to determine whether the content is a normally sold content based on the acquired individual identification information.

\* \* \* \* \*